United States Patent Office 3,646,195
Patented Feb. 29, 1972

3,646,195
METHOD OF REDUCING ADHESIVENESS AND AGGREGATION OF BLOOD PLATELETS
Axel Fredrik Valdemar Eriksson and Per Olov Svard, Sodertalje, Sweden, and Jorg Jurgens, Frankfurt am Main, Germany, assignors to Aktiebolaget Astra, Sodertalje, Sweden
No Drawing. Original application Aug. 26, 1966, Ser. No. 575,406, now Patent No. 3,509,024. Divided and this application Jan. 20, 1970, Ser. No. 4,421
Int. Cl. A61k 19/00
U.S. Cl. 424—94                                    4 Claims

ABSTRACT OF THE DISCLOSURE

An aspergillopeptidase ARL 1 isolated from a mixture of aspergillopeptidases has been found effective in reducing adhesiveness and aggregation of blood platelets and is useful in the prevention of the formation of thrombi and emboli.

---

This application is a divisional application of our copending application Ser. No. 575,406, filed Aug. 26, 1966, now Pat. No. 3,509,024.

The present invention relates to a method of reducing the adhesiveness and aggregation of blood platelets and a method for the prevention of the formation of thrombi and emboli in mammals and to pharmaceutical preparations used therefor.

A thrombus may be characterized as a plug or clot in a blood vessel or in one of the cavities of the heart remaining at the site of its formation. In case it is caught by the blood stream and brought to a distant vessel, where it may be forced into and become stuck in a smaller one so as to obstruct the circulation, one speaks of an embolus. The mechanism of the formation of thrombi is complex in nature and involves primarily aggregation and adherence of the blood platelets (thrombocytes), and secondarily plasma coagulation, and also other factors. Most scientists agree that a primary cause of the formation of thrombi and emboli is to be found in a disturbance of the functional behavior of the blood platelets and in an increased tendency for their aggregation (see, for example, Hellem, A. and Owren, P. A., Acta Haematologica 31 (1964), 230; Leading article Lancet 2 (1964), 295).

After adherence to tissue cells or collagen fibres or aggregation the platelets undergo structural changes, "viscous metamorphosis," and form a "white head," which constitutes the nucleus of the thrombus.

Considerable efforts have therefore in recent years been made to elucidate the mechanism of platelet adhesion and aggregation. Many agents have been found that can induce aggregation; thrombin and adenosine-diphosphate (ADP) having been studied most. Substances have been found which used in in vitro and/or in in vivo systems inhibit platelet adhesion and aggregation. Thus, there are claims that nialamid in some special circumstances is effective, but these have not been confirmed. Platelets can also be rendered non-adhesive to surfaces and to each other by adding cocaine, but the high concentration of cocaine which is required is lethal to the intact animal. Adenosine or adenosine monophosphate (AMP) inhibits platelet adhesion and aggregation but would be rapidly removed if injected into the blood stream. Therapeutically tolerable doses of phentolamine had no demonstrable effect on platelets or on the bleeding time. Macromolecules such as Dextran and low molecular weight Polybrene also interfere with platelet adhesion and aggregation. Monoiodoacetate, after half an hour, also renders platelets non-adhesive. Clearly, none of these methods is clinically practicable. (O'Brien, J. R., Editorial article. Blood 23 (1964), 309.)

The use of anticoagulants such as heparin or cumarin derivatives blocks the secondary process—plasma coagulation, but the adhesiveness and aggregation of platelets are not affected thereby. Even heparin, which is the most powerful anticoagulant, does not counteract the adhesion to glass, or the aggregation caused by ADP. Thus, in the prevention of thrombotic occlusions particularly coronary thrombosis, it is more important to prevent platelet aggregation than blood coagulation.

An increased aggregation with an increased liability to formation of thrombi and emboli has been found in many different kinds of illnesses as well as after major surgery and partus, and a method that could reduce an abnormally high platelet aggregation must be considered as being of great practical value. No such clinically effective method has yet been available.

An object of the present invention is therefore to provide a method capable of preventing the formation of thrombi and emboli by reducing the adhesiveness and the aggregation of blood platelets in animals, including humans.

Another object is to provide pharmaceutical preparations useful in the treatment of animals, including humans, for preventing the formation of thrombi and emboli.

According to the present invention these objects are obtained by the use of an aspergillopeptidase, ARL 1, the preparation and properties of which are described in our copending application Ser. No. 575,406, filed Aug. 26, 1966.

In accordance with our invention, the adhesiveness and aggregation of blood platelets in veins and arteries of animals, including humans, is effected by administering intravenously a solution containing between 0.1 and 10 mg., preferably between 1 to 4 mg. of an aspergillopeptidase ARL 1, said aspergillopeptidase being characterized in (a) being a protein of uniform composition;
(b) being readily soluble in water, saline solution and conventional buffered solutions;
(c) being stable and retaining its enzymatic activity at room temperature for more than a year in dry powder form;
(d) being stable in about neutral aqueous solution at 4° C., practically without losing its enzymatic activity, for more than two months;
(e) being stable in about neutral aqueous solution at 37° C., practically without losing its enzymatic activity, for more than 24 hours;
(f) having an ultraviolet absorbtion spectrum characteristic of proteins containing aromatic amino acids;
(g) being proteolytically active against casein, hemoglobin and fibrin;
(h) having a proteolytic optimum with hemoglobin at pH 5.0–5.5;
(i) not being able to hydrolyze Na-tosyl-L-arginine ethyl ester and N-acetyl-L-tyrosine ethyl ester;
(j) being able to reduce the adhesiveness and aggregation of blood platelets;
(k) being adsorbed on carboxymethylcellulose at pH 5.5;
(l) being eluted therefrom by an ammonium acetate solution buffered at pH 7.5 and having a molarity higher than 0.005 and preferably equal to or higher than 0.01 to 0.10;
(m) being retarded during chromatography by Amberlite® CG:50 II equilibrated and eluted with 0.01 molar phosphate buffer pH 7.5;

(n) passing a hydroxylapatite column equilibrated and eluted with 0.001 molar phosphate buffer pH 6.80 without any significant adsorption;

(o) being retarded during gel filtration through Sephadex® G:50 F so as to appear in the elution liquid with its maximum at about a third of the difference in volume of elution liquid for glucose and that for dextran of a molecular weight of $5.10^5$ (cfr. Example 3);

(p) having a molecular weight of 20,000–30,000 determined by ultracentrifugation.

Aspergillopeptidase ARL 1, which has an UV-spectrum characteristic of proteins containing aromatic amino acids is readily soluble in water, saline solution and buffer solutions. In dry powder form it is stable for more than a year without loss of enzymatic activity, i.e., without losing its properties to prevent adhesion and aggregation of blood platelets. Likewise aqueous solutions are stable at 4° C. for months and at 37° C. for more than 24 hours without loss of enzymatic activity.

The $LD_{50}$ (I.V.) of aspergillopeptidase ARL 1 in male albino mice was 9.5 mg./kg. body-weight.

Aspergillopeptidase ARL 1, upon dissolving in or possibly after drying and redissolving in an injectable medium, gives a solution by which a single dose of 0.1 to 10 mg., such as 0.5 to 7 mg., preferably 1 to 4 mg., of aspergillopeptidase ARL 1 can be administered. As solvent medium water is generally preferred and it may be made isotonic by the addition of for instance sodium chloride, glucose or levulose. In cases where there are indications for using other drugs these may be added to the injectable solutions provided that they are compatible.

According to the present knowledge ADP (adenosinodiphosphate) plays a vital role in the mechanism of adhesion and aggregation of platelets and thereby occupies a key position in such processes as thrombosis. This property of ADP can also be demonstrated in vitro with different techniques, some of which are also suited for study of agents interfering with the ADP effect. Thus the influence of a preparation having about 1% by weight of asperigillopeptidase ARL 1 (hereinafter referred to as Enzyme Mixture A) on the ADP-induced aggregation of rabbit platelets has been studied into two in vitro systems.

In one of the systems washed platelets which had been isolated from the blood by differential centrifugation and suspended in an artificial medium were used. In the other system the platelets were left in their natural milieu—the plasma—after removal of the red blood cells by centrifugation. In both systems aggregation after addition of ADP was recorded as a change in turbidity or optical density and it was observed how previous addition of the aspergilloprotease preparation in vitro modified the ADP-response.

In a third method used, aspergilloprotease instead of being added in vitro was administered to the animal before the collection of blood samples and the preparation of platelet-rich plasma. At various times after the injection of the enzyme, the aggregation of platelets in response to added ADP was studied photometrically as above and any change compared to pretreatment values was attributed to the enzyme administered.

With washed platelets of rabbits suspended in buffered saline, ADP with the addition of calcium ions caused an efficient aggregation of the platelets. The time course of the process was followed by readings of the optical density at one minute intervals. It was found that after approximately 10 minutes a maximum aggregation had occurred and no further increase was noted on further observation. When the values for maximum aggregation at 15 min. (caused by a fixed concentration of calcium and ADP) were compared, it was observed that the previous addition of Enzyme Mixture A preparation in low concentrations ($10^{-1}$–$10^{-5}$ μg. per ml.) effectively inhibited the ADP-response. This effect displayed a short latent period but once established the inhibition was not further enhanced by longer pre-incubation. The inhibition of the ADP-induced aggregation was found not to require calcium ions since it could be obtained in a medium containing the efficient calcium-chelator EDTA. As a further characteristic of this inhibiting effect of the enzyme it was observed that, once manifested, the enzyme-treated platelets could be washed repeatedly without materially losing their resistance to added ADP.

When Enzyme Mixture A was added in vitro to unwashed platelets suspended in plasma, it was also possible to demonstrate that this enzyme preparation caused a resistance to subsequent additions of ADP, though the concentrations required were considerably higher than in the above-mentioned test system. The existence of a short latent period in the action of the enzyme was confirmed also in this system.

If Enzyme Mixture A preparation was administered intravenously to the animal its effect on the ADP-induced aggregation of subsequently withdrawn platelet-rich plasma was not observed until 24–48 hours after the administration. The reason for this discrepancy between in vivo and in vitro findings with respect to the latent period is not as yet known. Once manifested, the inhibition of ADP-induced aggregation persisted for three to four days. This could be prolonged by repeated injections of the preparation.

The effect of the enzyme preparation in humans was also studied in 28 patients, some with normal, but most of them with pathologically increased, aggregation values (normal value 37%). The determination of the aggregation consisted in submitting plasma samples to a reproducible aggregation stimulus, for a definite period of time, whereafter the plasma sample was filtered. The number of thromobocytes was counted electronically before and after the procedure. (The procedure is described in detail by Jürgens, Life Sciences, 7 (1966) pp. 1379–87.) The difference gives a measure of the aggregation. The number of aggregated thrombocytes is expressed as percent of the original number and is hereinbelow referred to as aggregation value. The Enzyme Mixture A preparations were given by slow intravenous injection or by intravenous infusion. It was found that the administration of 120–150 mg. of the enzyme preparation always resulted in a distinct reduction of the aggregation of the platelets. In some cases, even a dose of 60 mg. was sufficient to give the desired response. An increase of the dose to 180–200 mg. caused a more longlasting effect. By repeated administrations for example of 150 mg. each 4–6 days, it was possible to obtain low aggregation values for a very long period of time. In these tests the preparation has been very well tolerated without serious side-effects.

When aspergillopeptidases are used in therapy according to the invention for preventing the formation of thrombi and emboli they should be administered by slow intraveous injection or intravenous infusion. When using an enzyme mixture, wherein aspergillopeptidase ARL is present in an amount of about 1–2% by weight, calculated on dry powder, the dose generally varies between 50 and 200 mg., which dose may be administered each 4–6 days to obtain a prolonged effect. The dosage and the time interval between the administrations depends on the response of the patient. Quantitative comparisons between isolated asperigillopeptidase ARL 1 and enzyme mixtures containing ARL 1 are not completed but ARL 1 displays the desired effect at much lower concentrations than the enzyme mixtures.

The invention will now be described more in detail by examples showing the effects thereof on blood from animals and on injection in man, the latter being also illustrated by diagrams reproduced in the attached drawing, showing the effect of intravenous infusion of the Enzyme Mixture A in human on the spontaneous platelet aggregation A, expressed in percent, as a function of the time T elapsed from the start of the administration, the instants of administration being indicated by arrows.

In the drawing:

FIGS. 1 and 2 illustrate the effects of a single intravenous dose of 120 mg. and 150 mg., respectively, of the preparation on three patients, and FIG. 3 illustrates the effect of repeated intravenous doses of 150 mg. of the preparation on one patient.

EXAMPLE 1

Blood was obtained from an ether-anesthetized rabbit by a plastic cannula placed in one carotid artery. The blood taken was immediately mixed with 0.075 volume of 0.077 M sodium EDTA adjusted to pH 7.4 in a plastic centrifuge tube. In all subsequent operations siliconized glassware was used. The blood was centrifuged in a refrigerated centrifuge (+5° C.) at 250× g., for 12 min. to remove the red blood cells. The upper ¾ of the supernatant containing the platelets was centrifuged again and the platelets thus sedimented. The sediment was washed by resuspension in a mixture containing 0.154 M sodium chloride, 0.154 M tris-hydrochloride buffer, pH 7.4, and 0.077 M EDTA in the proportions 90:8.2. Centrifugation was repeated for 12 min. at 250× g. The platelets were finally suspended in tris-buffered saline (0.154 M sodium chloride and 0.154 M tris-buffer pH 7.4 in the relation 9:1) to give a platelet count of approximately 500,000 per cu. mm. Such suspensions of platelets were stored in ice for not more than five hours.

For the assay 3.0 ml. of said suspension was added to a siliconized colorimeter tube, which was placed in a Klettsummerson colorimeter. Stirring was accomplished by a siliconized glass rod, fitted to a synchronmeter operated at 1,000 r.p.m. Readings were made every minute at 620 mμ. A 4.5 minute control run was allowed before any additions were made. To avoid dilution the necessary additions were made in 10 μl. volumes. Calcium ions were added in the form of a solution of $CaCl_2$ to give a final concentration in the test sample of 1.1 mM. Likewise ADP to a conc. of 8 μg. per ml. was added.

The effect of 0.001, and 0.01 μg. of Enzyme Mixture A per ml. suspension, given 10 minutes before ADP, was compared with a control sample, where saline was added instead of the enzyme.

The results are compiled below, where the figures represent maximal aggregation 15 minutes after the addition of ADP:

Addition: Percent aggregation
Control ($Ca^{++}$, ADP) _____ 61
Enzyme Mixture A, 0.001 μg., $Ca^{++}$, ADP ____ 2
Enzyme Mixture A, 0.01 μg., $Ca^{++}$, ADP _____ 5

EXAMPLE 2

Platelet suspension was prepared as in Example 1, EDTA to a conc. of 1.5 mM. was added to the suspension. Enzyme Mixture A in doses of 0.001, 0.01 and 0.1 μg. per ml. suspension was incubated with the platelets for 5 min. at room temperature after which time they were sedimented by centrifugation, washed once and resuspended as in Example 1. As control a suspension sample was treated identically except for the omission of the enzyme. Calcium ions and ADP were added 5 min. after the samples were placed in the colorimeter.

Addition: Percent aggregation
Control ($Ca^{++}$, ADP) _____ 52
Enzyme Mixture A 0.001 γ/ml., $Ca^{++}$, ADP __ 2
Enzyme Mixture A 0.01 γ/ml., $Ca^{++}$, ADP ____ 15
Enzyme Mixture A 0.1 γm., $Ca^{++}$, ADP _____ 15

EXAMPLE 3

Platelet suspensions were prepared as described in Example 1. Enzyme Mixture A to a conc. of 0.001 μg. per ml. suspension was incubated with the platelets at room temperature for 5 min. After that time different samples were centrifuged and washed (as described in Example 1), 1, 2 and 3 times before final suspension. The effect of calcium ions and ADP was measured. As a control a sample of platelet suspension without enzyme was washed 3 times before assay.

Treatment: Percent aggregation
Control, washed 3 times ($Ca^{++}$, ADP) _____ 51
Enzyme Mixture A, 1 wash, $Ca^{++}$, ADP _____ 20
Enzyme Mixture A, 2 wash, $Ca^{++}$, ADP _____ 19
Enzyme Mixture A, 3 wash, $Ca^{++}$, ADP _____ 17

EXAMPLE 4

For the preparation of platelet-rich plasma blood was collected as described in Example 1 with the exception that 3.8% trisodium citrate was used as anticoagulant and was mixed with the blood in the preparations: 1 part citrate to 9 parts of blood. Centrifugation was made at room temperature for 15 min. at 300×g. Of the resultant platelet-rich supernatant the upper ¾ was used for the assay. In this system calcium ions need not be added, whereas ADP was used in a final conc. of 8 μg. per ml. plasma. The aggregation was estimated as described in Example 1. Enzyme Mixture A was added to a final concentration of 10, 25 and 50 μg. per ml. plasma 10 min. prior to ADP. The degree of inhibition compared to a control without enzyme was calculated.

Addition: Percent inhibition of aggregation
Enzyme Mixture A, 10 μg./ml., ADP _____ 24
Enzyme Mixture A, 25 μg./ml., ADP _____ 47
Enzyme Mixture A, 50 μg./ml., ADP _____ 62

EXAMPLE 5

Five ml. blood was taken from a male albino rabbit, weighing 2.2 kg. The blood was mixed with citrate and platelet-rich plasma prepared as in Example 4. The in vitro effect of added ADP on the platelets in the plasma was measured as in Example 2. Thereafter 4.0 mg./kg. of Enzyme Mixture A was infused intravenously and platelet-rich plasma collected at various times after this treatment. The aggregation in vitro after ADP addition was estimated as before.

Percent aggregation
Before injection _____ 56
4 hours after injection _____ 55
1 day after injection _____ 34
2 days after injection _____ 39
3 days after injection _____ 38
4 days after injection _____ 44
7 days after injection _____ 59

To study the effect over a longer period of time a male albino rabbit, weighing 4.15 kg., was given intravenously 4.0 mg./kg. of the Enzyme Mixture A. On the fifth day a second dose of 4.0 mg./kg. of the enzyme was administered.

Percent aggregation
Before injection _____ 61
1 days after injection _____ 51
3 days after injection _____ 40
4 days after injection _____ 39
5 days after injection _____ 52

Second injection:

6 days after first injection _____ 40
7 days after first injection _____ 20

EXAMPLE 6

Platelet suspensions were prepared and the effect of ADP was estimated as described in Example 1. Aspergillopeptidase ARL 1 was added to the suspension 10 min. prior to ADP.

Addition: Percent aggregation
Control (Ca++, ADP) _____ 51
Aspergillopeptidase ARL 1, 10 μg./ml., Ca++, ADP _____ 0
Aspergillopeptidase ARL 1, 10 μg./ml., Ca++, ADP _____ 0
Aspergillopeptidase ARL 1, 10 μg./ml., Ca++, ADP _____ 0
Aspergillopeptidase ARL 1, 10 μg./ml., Ca++, ADP _____ 0

EXAMPLE 7

Platelet-rich plasma was prepared and the effect of ADP was estimated as described in Example 1. To compare the effectiveness in reducing the aggregation, aspergillopeptidase ARL 1 and Enzyme Mixture A were added 10 minutes before ADP.

Addition: Percent aggregation
Control (ADP) _____ 55
Enzyme Mixture A 50 μg./ml., ADP _____ 45
Aspergillopeptidase ARL 1, 2.5 μg./ml., ADP __ 29
Aspergillopeptidase ARL 1, 5.0 μg./ml., ADP __ 15

The effect of aspergillopeptidase ARL 1 preparations in humans is shown in the following examples:

EXAMPLE 8

120 mg. of Enzyme Mixture A, in the form of a sterile dry powder, was dissolved in 500 ml. of 5% levulose solution and was administered by intravenous infusion at a constant rate during one hour to a patient, the platelet aggregation value of which had been determined before treatment. After completed infusion the effect on the spontaneous aggregation was followed through studying plasma samples taken at regular intervals.

In FIG. 1 the results from three patients are given. Before treatment one patient showed a normal and two a pathologically increased aggregation value. In all the cases a marked decrease of the aggregation was observed with maximal reduction on the fourth day after administration.

EXAMPLE 9

In the same manner as described in Example 8, 150 mg. of Enzyme Mixture A was administered and the effect was studied as described earlier. FIG. 2 shows the results from three patients treated with this dose. A significant lowering of the aggregation value was observed.

EXAMPLE 10

A patient with a strongly increased aggregation of the platelets, who therefore was considered to run the risk of having a thrombus or embolus was treated as described in Example 8 with repeated doses of 150 mg. whereafter the effect on the aggregation was determined.

The results are shown in FIG. 3. A marked reduction of the aggregation is observed already after administration of the first dose and it is also shown that it is possible by administering new doses to maintain the aggregration at a low level without fluctuations for a long time.

We claim:
1. A method of preventing the formation of thrombi and emboli in veins and arteries of animals which comprises administering intravenously in solution from about 0.1 to 10 mg. of an aspergillopeptidase, aspergillopeptidase ARL 1, charcterised in
   (a) being a protein of uniform composition;
   (b) being readily soluble in water, saline solution and conventional buffered solution;
   (c) being stable and retaining its enzymatic activity at room temperature for more than a year in dry powder form;
   (d) being stable in about neutral aqueous solution at 4° C., practically without losing its enzymatic activity, for more than two months;
   (e) being stable in about neutral aqueous solution at 37° C., practically without losing its enzymatic activity, for more than 24 hours;
   (f) having an ulttraviolet absorption spectrum characteristic of proteins containing aromatic amino acids;
   (g) being proteolytically active against casein, hemoglobin and fibrin;
   (h) having a proteolytic optimum with hemoglobin at pH 5.0–5.5;
   (i) not being able to hydrolyze Na-tosyl-L-arginine ethyl ester and N-acetyl-L-tyrosine ethyl ester;
   (j) being able to reduce the adhesiveness and aggregation of blood platelets;
   (k) being adsorbed on carboxymethylcellulose at pH 5.5;
   (l) being eluted therefrom by an ammonium acetate solution buffered at pH 7.5 and having a molarity higher than 0.005 and preferably equal to or higher than 0.01 to 0.10;
   (m) being retarded during chromatography by Amberlite® CG:50 II equilibrated and eluted with 0.01 molar phosphate buffer pH 7.5;
   (n) passing a hydroxylapatite column equilibrated and eluted with 0.001 molar phosphate buffer pH 6.80 without any significant adsorption;
   (o) being retarded during gel filtration through Sephadex® G:50 F so as to appear in the elution liquid with its maximum at about a third of the difference in volume of elution liquid for glucose and that for dextran of a molecular weight of $5.10^5$;
   (p) having a molecular weight estimated by gel filtration lower than that of the aspergillopeptidase protease 1, which has a molecular weight of 20,000–30,000 determined by ultracentrifugation.

2. A method according to claim 1 wherein from about 1 to 4 mg. of aspergillopeptidase ARL is administered.

3. A method according to claim 1 where the solution is a sterile aqueous solution.

4. A method according to claim 3 wherein the sterile aqueous solution contains from about 1 to 4 mg. of apsergillopeptidase ARL 1.

No references cited.

RICHARD L. HUFF, Primary Examiner